United States Patent
Sakamoto et al.

(10) Patent No.: US 7,709,804 B2
(45) Date of Patent: May 4, 2010

(54) RADIATION DETECTOR

(75) Inventors: Yoshiaki Sakamoto, Kanagawa (JP);
Futoshi Yoshida, Kanagawa (JP);
Takashi Shoji, Kanagawa (JP); Takeshi Asano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/219,345

(22) Filed: Jul. 21, 2008

(65) Prior Publication Data
US 2009/0026382 A1    Jan. 29, 2009

(30) Foreign Application Priority Data
Jul. 27, 2007    (JP) .............................. 2007-196525

(51) Int. Cl.
*G01T 1/24*    (2006.01)
(52) U.S. Cl. ................................. 250/370.09
(58) Field of Classification Search ............. 250/484.4, 250/370.11, 370.09
See application file for complete search history.

(56) References Cited

U.S. PATENT DOCUMENTS

| | | | | |
|---|---|---|---|---|
| 4,728,798 A | * | 3/1988 | Fukuda et al. | 250/484.4 |
| 6,075,248 A | * | 6/2000 | Jeromin et al. | 250/370.09 |
| 7,151,263 B2 | * | 12/2006 | Homme et al. | 250/370.11 |

FOREIGN PATENT DOCUMENTS

JP    A 2006-58171    3/2006

* cited by examiner

*Primary Examiner*—Constantine Hannaher
(74) *Attorney, Agent, or Firm*—Sheldon J.. Moss; Chad M. Herring

(57) ABSTRACT

A radiation detector includes a substrate, a lower electrode disposed on the substrate, a radiation detecting layer formed on the upper surface of the lower electrode, an upper electrode formed on the upper surface of the radiation detecting layer, a protection layer which is formed on the upper electrode, whose end portion extends to an end surface of the substrate and which covers the upper electrode, and a reinforcement member which is formed from the lower surface of the substrate to the surface of the protection layer and which covers the end portion of the protection layer.

7 Claims, 14 Drawing Sheets

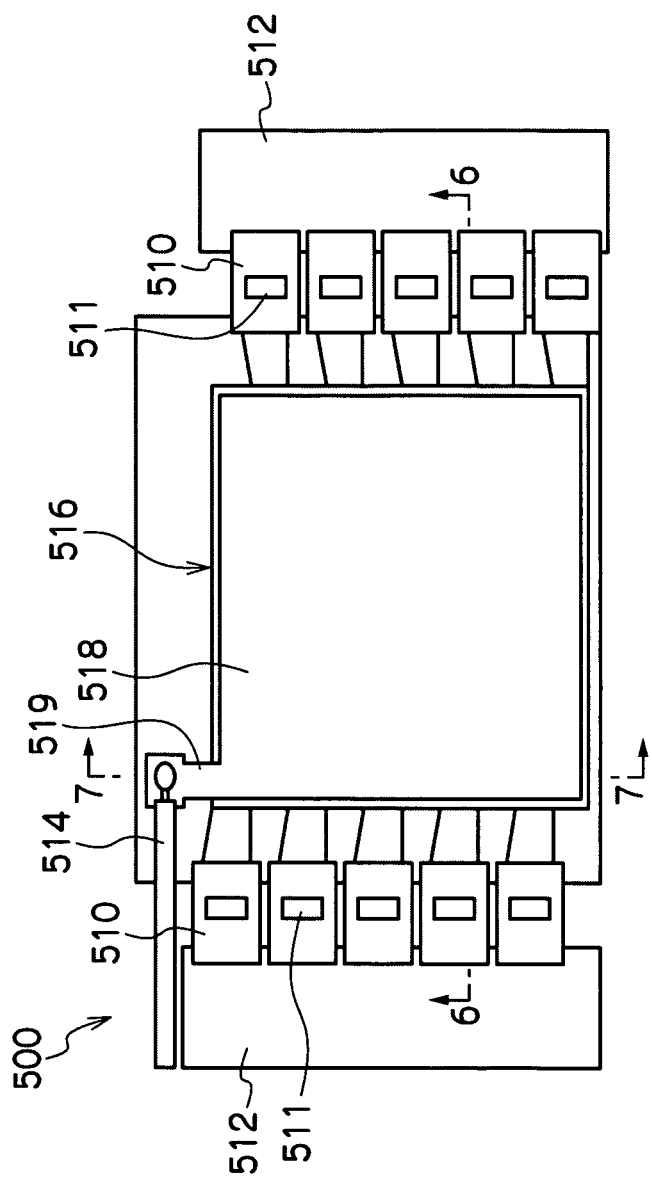
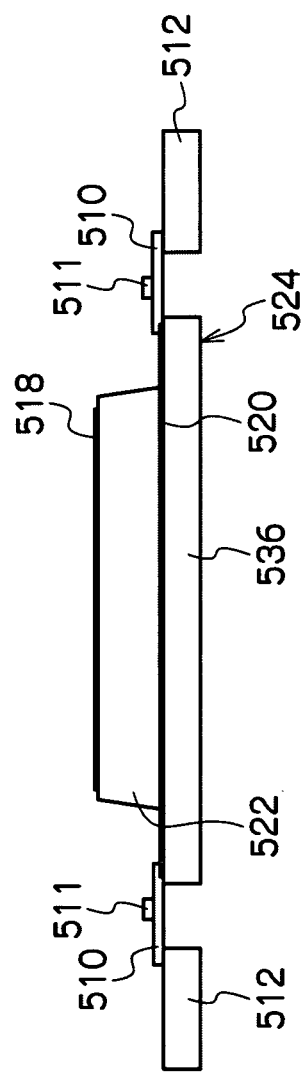
FIG. 1A
FIG. 1B

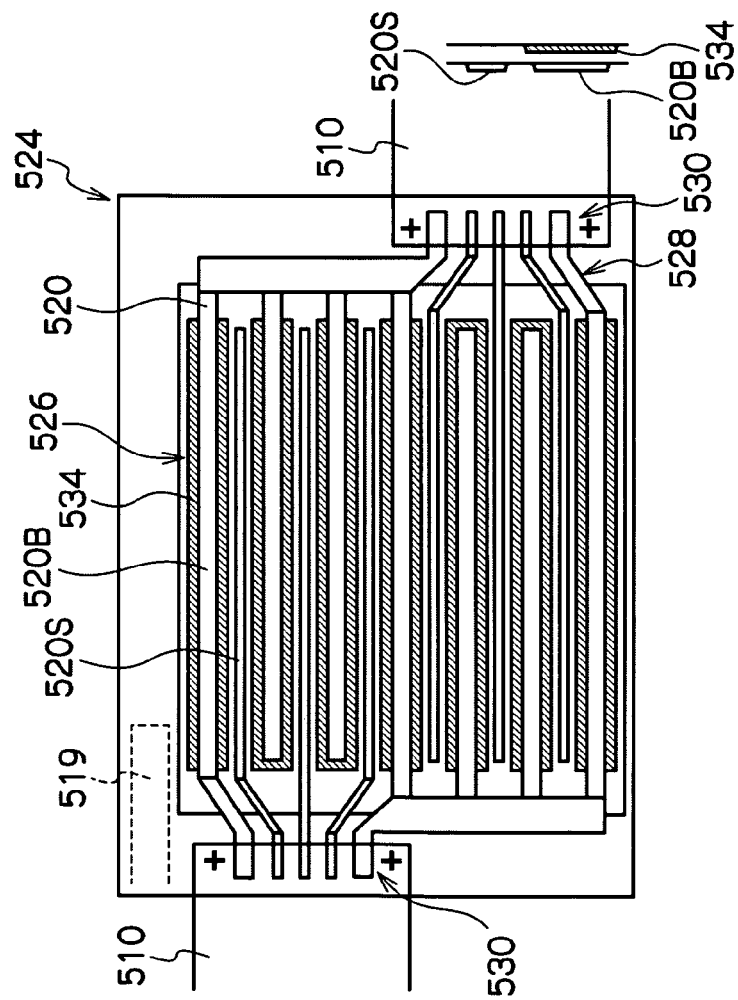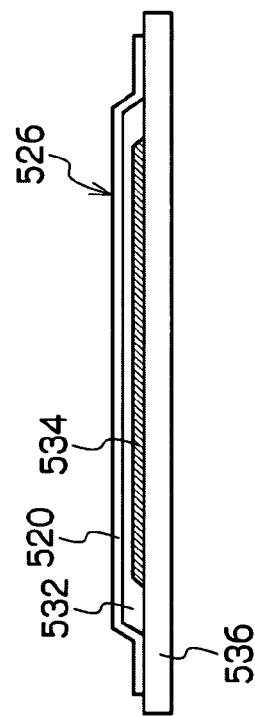
FIG. 2A
FIG. 2B

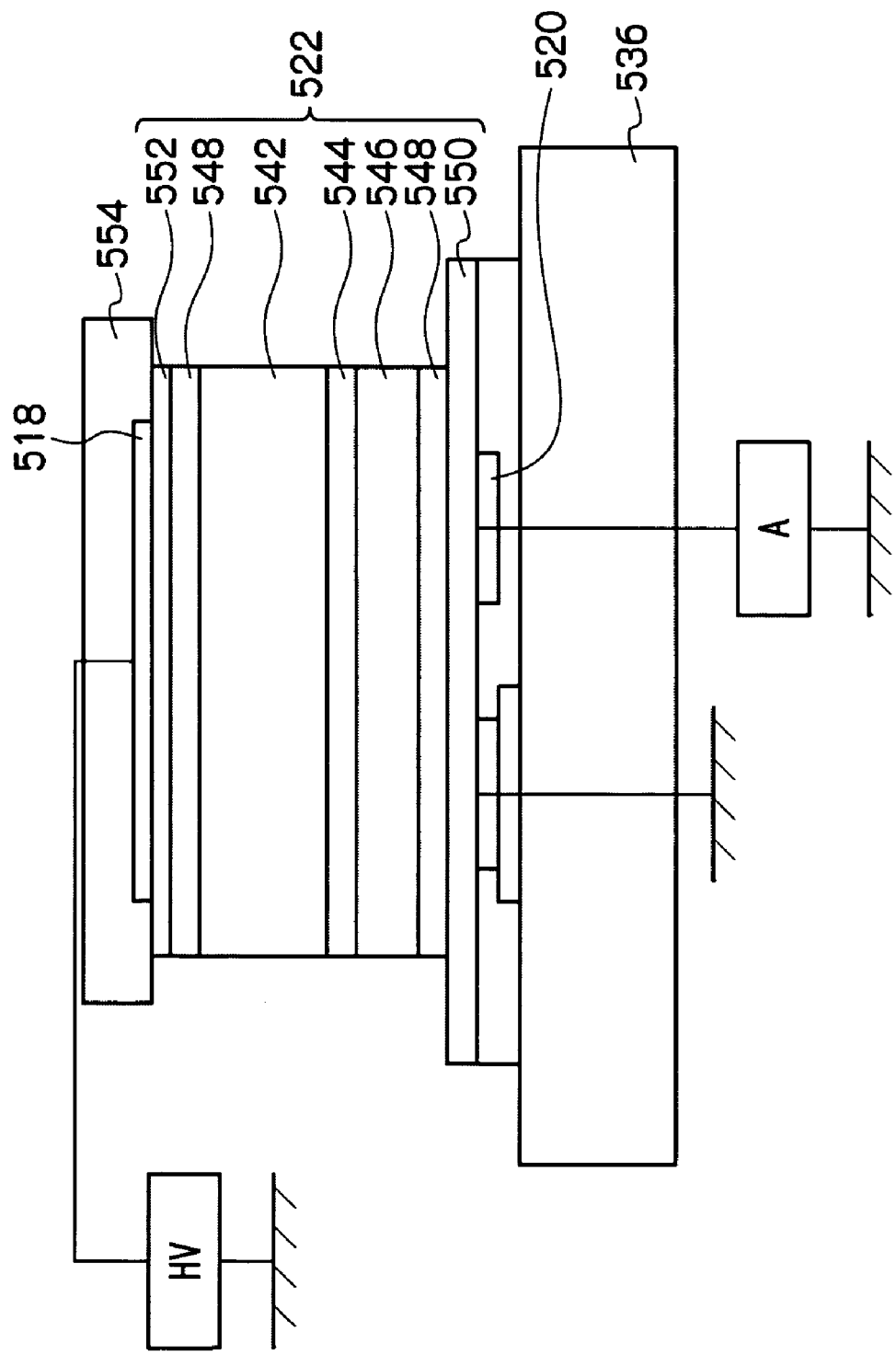

RADIATION DETECTOR

CROSS-REFERENCE TO RELATED APPLICATION

This application claims priority under 35 USC 119 from Japanese Patent Application, No. 2007-196525, the disclosure of which is incorporated by reference herein.

BACKGROUND OF THE INVENTION

1. Technical Field

The present invention relates to a radiation detector used in a medical radiographic apparatus.

2. Related Art

There are known, as a radiation detector, an indirect conversion type electromagnetic radiation detector by which, after radiation such as X-rays and the like is converted into light first, the converted light is further converted into an electric signal by photoelectric conversion. And a direct conversion type electromagnetic radiation detector by which incident radiation is converted into an electric signal immediately by a charge conversion layer. Further, the radiation detector disclosed in Japanese Patent Application Laid-Open (JP-A) No. 2006-58171 is known as the electromagnetic radiation detector using photostimulable phosphor.

In the radiation detector, a vapor proof protection film as a protection layer has bent portions and an end portion. The bent portion is bent along a side surface and the back surface of a substrate, and the end portion is bonded to the bottom surface of the substrate on one side thereof by a seal bonding layer. The bonding length of the vapor proof protection film bonded on the bottom surface of the substrate is a length by which a vapor proof effect may be obtained and 2 mm or more.

A vapor proof effect may not be obtained in a case that a vapor proof protection film is bonded on the top surface of the substrate where the distance between a phosphor layer and the side surface at one side of the substrate is short. According to the above arrangement however, even in the configuration that the distance between a phosphor layer and the side surface of the substrate is short, a predetermined vapor proof effect may be obtained. As a result, an image position necessary to radiograph an image of a breast wall portion may be secured by reducing the distance between the end portion of the phosphor layer and the side surface of the substrate. With this arrangement, the radiation detector may be preferably applied to mammography.

SUMMARY

However, when the vapor proof protection film is deteriorated with time or when the vapor proof protection film is touched from the outside, the end portion of the vapor proof protection film is liable to be rolled up.

When the end portion of the vapor proof protection film is rolled up, there is a possibility that the vapor proof protection film is peeled and broken.

In view of the above, the present invention is to suppress a protection layer from being broken on the end surface of a substrate of a radiation detector.

The electromagnetic radiation detector according to an aspect of the invention includes a substrate, a lower electrode disposed on the substrate, a radiation detecting layer formed on the upper surface of the lower electrode, an upper electrode formed above the upper surface of the radiation detecting layer, a protection layer which is formed on the upper electrode, whose end portion extends to the end surface of the substrate, and which covers the upper electrode, and a reinforcement member which is formed from the lower surface of the substrate to the surface of the protection layer and which covers the end portion of the protection layer.

BRIEF DESCRIPTION OF THE DRAWINGS

FIGS. 1A and 1B are views showing a schematic arrangement of an electromagnetic radiation detecting substrate as an electromagnetic radiation detector using a light reading system.

FIGS. 2A and 2B are views showing a schematic structure of an electromagnetic radiation detecting lower substrate of the electromagnetic radiation detecting substrate of FIG. 1A.

FIG. 3 is a schematic view schematically showing an arrangement of the electromagnetic radiation detecting substrate of FIG. 1A.

DETAILED DESCRIPTION OF THE INVENTION

Figure 4:
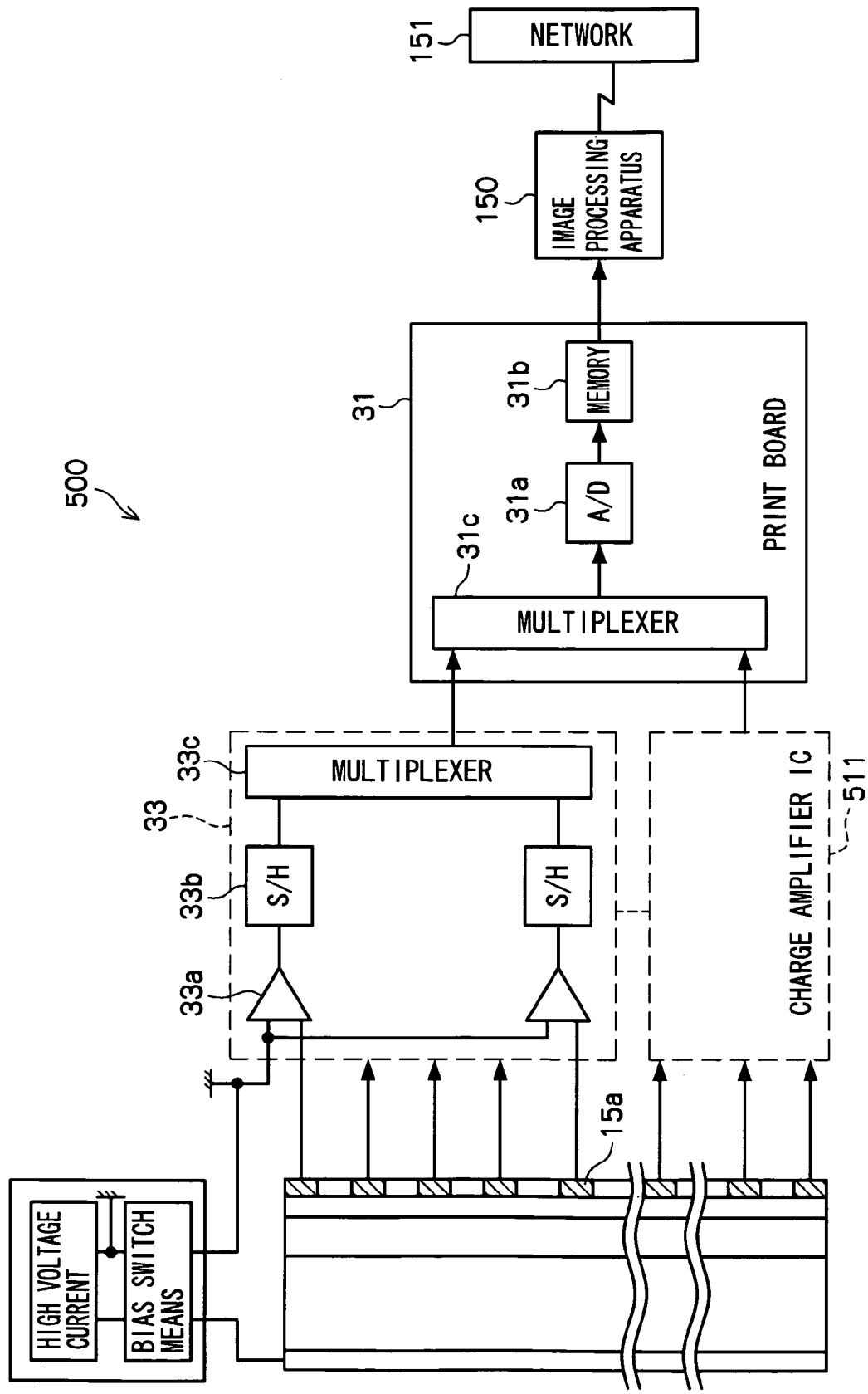
FIG. 4 is a block diagram of an arrangement of a charge output amplifier as well as an aspect of connection of the charge output amplifier to an image processing apparatus and the like disposed outside of the electromagnetic radiation detecting substrate.

An exemplary embodiment of a radiation detector according to the present invention will be explained below based on drawings.

The radiation detector according to the exemplary embodiment is used in an radiographic apparatus, has an electrostatic recording unit including a photoconductive layer which exhibits conductivity when it is radiated with radiation, records image information when it is radiated with radiation carrying the image information, and outputs an image signal showing the recorded image information.

The radiation detector includes a radiation detector using a so-called optical reading system using a semiconductor material for generating charges in response to radiation of light, a radiation detector using an electric reading system which accumulates the charges generated by irradiation and detects the accumulated charges by turning on and off the pixels of an electric switch such as thin film transistor (TFT), charge coupled device (CCD), or complementary metal oxide semiconductor (CMOS) sensor one by one.

(Configuration of Radiation Detector Using Optical Reading System)

First, a radiation detecting substrate 500 will be explained here as the radiation detector using the optical reading system. FIGS. 1A and 1B show schematic views of the radiation detecting substrate 500. The radiation detecting substrate 500 according to the exemplary embodiment is used particularly for mammography to detect X-rays for breast radiography.

As shown in FIGS. 1A and 1B, a TCP 510, a read-out device 512 connected through the TCP 510, and a high voltage wirings 514 for applying a high voltage are connected to the radiation detecting substrate 500.

Each of the TCPs 510 is a flexible wiring substrate on which a signal detection IC (charge amplifier IC) 511 is mounted. The TCP 510 is thermally connected under pressure using ACF (Anisotropic Conductive Film).

An extended electrode 519 is formed so as to extend from an upper electrode 518 on a detection area 516, and the high voltage wire 514 is fixed to the extended electrode 519 by a conductive bonding agent. The detection area 516 for detecting radiation is composed of lower electrodes 520 for reading out signals and applying a high voltage, a radiation detecting layer 522 for converting the radiation into charges, and an upper electrode 518 for applying the high voltage.

The radiation detecting substrate 500 is manufactured roughly by a process for forming a lower radiation detecting substrate 524 including the lower electrodes 520, a process for forming the radiation detecting layer 522 and the upper electrode 518, and a process for connecting the high voltage wire 514.

The structure of the lower radiation detecting substrate 524 will be explained below. FIG. 2 shows a schematic structure of the lower radiation detecting substrate 524. In FIG. 2, each one sets of the TCPs 510 are formed on the right and left sides and each TCP 510 has three channels, that is, the TCPs 510 have six channels in total for explanation simplification. As shown in FIG. 2, the lower radiation detecting substrate 524 is composed of a radiation detecting unit 526, a pitch conversion unit 528, and TCP connecting portions 530.

The lower electrodes 520 are disposed to the radiation detecting unit 526 in a stripe shape (line shape) to output signals. Further, color filter layers 534 are formed below the lower electrodes 520 so that light having an optional wavelength may be transmitted through organic transparent insulation layers 532.

The layers located above the color filter layers 534 are called common B lines 520B, and the layers located above the portions where the color filter layers 534 are not formed are called signal S lines 520S. The B lines 520B are made to a common line outside of the radiation detecting unit and have a comb-shaped electrode structure. The S lines 520S are used as signal lines. The B lines 520B have a width of, for example, 20 μm, the S lines 520S have a width of, for example, 10 μm, and the interval between the B line 520B and the S line 520S, is, for example, 10 μm.

The color filter layer 534 has a width of for example, 30 μm. The lower electrode 520 must be transparent to radiate light from the back surface thereof and must be flat to prevent it from being broken by the concentration of an electric field when the high voltage is applied thereto, and, for example, IZO, ITO are used for the lower electrode 520. When IZO is used, the lower electrode 520 has a thickness of about 0.2 μm and a flatness Ra of about 1 nm.

The color filter layers 534 are composed of a photosensitive resist in which pigment is dispersed, for example, a red resist used for, for example, a LCD color filter. To eliminate the uneven portion of the color filter layers 534, the organic photosensitive transparent insulation layers 532, for example, PMMAs are used.

Further, a substrate 536 acting as a support member is preferably rigid transparent glass and more preferably soda lime glass. As an example of the thickness of the respective layers, the thickness of the lower electrode 520 is 0.2 μm, the thickness of the color filter layer 534 is 1.2 μm, the thickness of the transparent organic insulation layer 532 is 1.8 μm, and the thickness of the glass substrate 536 is 1.8 mm. The color filter layers 534 and the organic insulation layers 532 are located only to the radiation detecting unit 526, and the boundaries thereof are located in the radiation detecting unit 526 and the pitch conversion unit 528. Accordingly, IZO wirings are formed on the glass substrate 536 in the TCP connecting portions 530 through the boundary step portions of the organic insulation layers 532.

In the radiation detecting unit 526, wirings may be taken out to the right and left TCPs 510 in the unit of a certain number. In FIG. 2, the wirings are taken out in the unit of three lines. An example of the number of the lines is 256. The width of the lines in the radiation detecting unit 526 is different from that in the TCP connecting portions 530. To adjust the difference of the widths and to wire the wirings up to predetermined TCP connecting positions, the width of the lines is adjusted at the pitch conversion unit 528. The B lines 520B are made to a common line and wired up to the TCP connecting portions 530 likewise.

The common B line 520B which are made common outside of the radiation detecting unit and the signal S lines 520S are disposed to the TCP connecting portions 530. The common B lines 520B are disposed outside of the signal S lines 520S. As an example of the number of the lines, the signal lines are 256 lines and each of the upper and lower common lines is 5 wirings, and they are connected to the TCPs. The electrode line/space is 40/40 μm.

Further, a TCP alignment mark is necessary to connect the TCPs in the TCP connecting portions 530. Although it is preferable to form the TCP alignment mark of a transparent electrode, it is difficult to recognize it because it is transparent. Thus, the alignment mark is formed using, for example, the color filter layers 534, which is the member for constituting the substrate and an opaque material.

Next, the radiation detecting layer 522 will be explained. FIG. 3 is a schematic view showing an arrangement of the radiation detecting substrate 500. As shown in FIG. 3, the radiation detecting layer is composed of a recording photoconductive layer 542, a charge accumulation layer 544, a reading photoconductive layer 546, an electrode interface layer 548, an under coating layer 550, and an upper coating layer 552.

<Recording Photoconductive Layer>

The recording photoconductive layer 542 is a photoconductive substance for generating charges by absorbing a wave and composed of a compound mainly composed of at least one of an amorphous selenium compound, $Bi_{12}MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K), PbO, $HgI_2$, $PbI_2$, CdS, CdSe, CdTe, $BiI_3$, GaAs. In particular, it is more preferable that the recording photoconductive layer 542 be composed of the amorphous selenium compound.

When the amorphous selenium compound is used as the recording photoconductive layer 542, the layer 542 may be doped with alkali metal such as Li, Na, K, Cs, Rb in the slight amount from 0.001 ppm to 1 ppm, doped with fluoride such as LiF, NaF, KF, CsF, RbF in the slight amount from 10 ppm to 10000 ppm, added with P, As, Sb, Ge from 50 ppm to 0.5%, doped with As from 10 ppm to 0.5%, and doped with Cl, Br, I in the slight amount from 1 ppm to 100 ppm.

In particular, amorphous selenium containing As from about 10 ppm to 200 ppm, amorphous selenium containing As from about 0.2% to 1% and further containing Cl from 5 ppm to 100 ppm, and amorphous selenium containing alkali metal from about 0.001 ppm to about 1 ppm are preferably used.

Further, amorphous selenium, which contains the fine particles of a photoconductive substance such as $Bi_{12}MO_{20}$ (M: Ti, Si, Ge), $Bi_4M_3O_{12}$ (M: Ti, Si, Ge), $Bi_2O_3$, $BiMO_4$ (M: Nb, Ta, V), $Bi_2WO_6$, $Bi_{24}B_2O_{39}$, ZnO, ZnS, ZnSe, ZnTe, $MNbO_3$ (M: Li, Na, K), PbO, $HgI_2$, $PbI_2$, CdS, CdSe, CdTe, $BiI_3$, GaAs each having a particle size of several nanometers to several micron meters may be used.

When the amorphous selenium is used, it is preferable that the recording photoconductive layer 542 have a thickness from 100 μm or more to 2000 μm or less. Further, it is particularly preferable that when the recording photoconductive layer 542 is used for mammography, the thickness of the layer 542 be 150 μm or more to 250 μm or less and that when the recording photoconductive layer 542 is used for taking a general purpose image, the thickness thereof be 500 μm or more to 1200 μm or less.

<Charge Accumulation Layer>

The charge accumulation layer 544 may be any film as long as it has an insulation property to the charges having a polarity desired to be accumulated and are composed of acrylic organic resin, polymer such as polyimide, BCB, PVA, acryl, polyethylene, polycarbonate, or polyetherimide, sulphide such as $As_2S_3$, $Sb_2S_3$, or ZnS, oxide, and fluoride. Further, a substance, which has the insulation property to the charges having the polarity desired to be accumulated and has conductivity to the charges having the a polarity opposite to the above polarity, is more preferable, and a substance, in which the product of the degree of mobility and the life is larger than the polarity of the charges by three digits or more, is more preferable.

Exemplified as preferable compounds are $As_2Se_3$ and $As_2Se_3$ doped with Cl, Br, I from 500 ppm to 20000 ppm, $As_2(Se_xTe_{1-x})_3$ (0.5<x<1) in which about 50% of Se in $As_2Se_3$ is replaced with Te, a compound in which about 50% of Se in $As_2Se_3$ is replaced with S, a compound in which the concentration of As in $As_2Se_3$ is changed about ±15%, and amorphous Se—Te in which Te is contained in the amount of 5 to 30 wt %.

When a substance containing these chalcogenide elements is used, the charge accumulation layer 544 preferably has a thickness from 0.4 μm or more to 3.0 μm or less and more preferably has a thickness from 0.5 μm or more to 2.0 μm or less. The charge accumulation layer 544 may be formed at a time or may be formed by the lamination performed at a plurality of times.

A compound in which polymer such as organic acrylic resin, polyimide, BCB, PVA, Acryl, polyethylene, polycarbonate, or polyetherimide each doped with a charge transport agent is preferably used as a preferable charge accumulation layer 544 using an organic film. Exemplified as a preferable charge transport agent are tris(8-quinolinolate)aluminum (Alq3), N,N-diphenyl-N,N-di(m-tolyl)benzidine (TPD), polyparaphenylene vinylene (PPV), polyalkylthiophene, polyvinylcarbazole (PVK), triphenylene (TNF), metal phthalocyanine, 4-(dicyanomethylene)-2-methyl-6(p-dimethylaminostyryl)-4H-pyrane (DCM), liquid crystal molecule, hexapentyloxy-triphenylene, discotic liquid crystal molecule whose center core contains a π conjugate condensed ring or transition metal, and molecule selected from a group composed of carbon nanotube and fullerene. A doping amount is set from 0.1 to 50 wt %.

<Reading Photoconductive Layer>

The reading photoconductive layer 546 is composed of a photoconductive substance for absorbing an electromagnetic wave, in particular, visible light and generates charges, and a semiconductor substance such as an amorphous selenium compound, amorphous Si:H, crystal Si, GaAs in which an energy gap is within the range from 0.7 to 2.5 eV may be used. In particular, the amorphous selenium compound is preferably used.

When the amorphous selenium compound is used as the reading photoconductive layer 546, the layer may be doped with alkali metal such as Li, Na, K, Cs, Rb in the slight amount from 0.001 ppm to 1 ppm, doped with fluoride such as LiF, NaF, KF, CsF, RbF in the slight amount from 10 ppm to 10000 ppm, added with P, As, Sb, Ge from 50 ppm to 0.5%, doped with As from 10 ppm to 0.5%, and doped with Cl, Br, I in the slight amount from 1 ppm to 100 ppm.

In particular, an amorphous selenium compound containing As from about 10 ppm to 200 ppm, an amorphous selenium compound containing As from about 0.2% to 1% and further containing Cl of from 5 ppm to 100 ppm, and an amorphous selenium compound containing alkali metal from about 0.001 ppm to 1 ppm are preferably used.

The reading photoconductive layer 546 may have any thickness as long as it may sufficient absorb reading light as well as may drift the charges, which are accumulated in the charge accumulation layer 544 and by which an electric field is optically excited; and the thickness is preferably from about 1 μm to 30 μm.

<Electrode Interface Layer>

The electrode interface layer 548 is disposed between the recording photoconductive layer 542 and the upper electrode 518 or between the reading photoconductive layer 546 and the lower electrodes 520. To prevent crystallization, an amorphous selenium compound added with As in the range from 1% to 20%, an amorphous selenium compound added with S, Te, P, Sb, Ge in the range from 1% to 10%, and an amorphous selenium compound added with the above elements and other elements in combination are preferably used.

Otherwise, $As_2S_3$ and $As_2Se_3$ having a higher crystallization temperature may be preferably used. Further, to prevent injection of charges from the electrode layer and in particular to prevent the injection thereof from the holes, alkali metal such as Li, Na, K, Rb, Cs and the molecules of LiF, NaF, KF, RbF, CsF, LiCl, NaCl, KCl, RbF, CsF, CsCl, CsBr may be preferably doped in the range from 10 ppm to 5000 ppm in addition to the additive elements. On the contrary, to prevent injection of electrons, a halogen element such as Cl, I, Br and the molecules of $In_2O_3$ may be also preferably doped in the range from 10 ppm to 5000 ppm. The thickness of the interface layer is preferably set from 0.05 μm to 1 μm to sufficiently achieve the above objects.

The electrode interface layer 548, the reading photoconductive layer 546, the charge accumulation layer 544, and the recording photoconductive layer 542 are layered on the substrate in such a manner that the substrate is held in a vacuum vessel set from $10^{-3}$ to $10^{-7}$ Torr at 25° C. or more to 70° C. or less, boats or crucibles in which the above alloys are contained are heated by resistance heating or electron beam heating, and the alloys or the compounds are evaporated or sublimated.

When the alloys and the compounds have greatly different evaporation temperatures, the concentrations of the added or doped substances may be preferably controlled by simultaneously heating a plurality of boats corresponding to a plurality of vapor deposition sources and individually controlling the boats. For example, a layer, in which amorphous selenium doped with 10% of As is doped with 5000 ppm of LiF, may be formed by containing $As_2Se_3$, amorphous selenium, and LiF in boats, respectively, setting the boat of $As_2Se_3$ to 340° C., the boat of amorphous selenium (a-Se) to 240° C., and the boat of LiF to 800° C., and opening and closing the shutters of the respective boats.

<Under Coating Layer>

The under coating layer 550 may be formed between the reading photoconductive layer 546 and the lower electrode (charge collection electrode) 520. When the electrode interface layer (crystallization prevention layer (A layer)) 548 is employed, the under coating layer 550 is preferably formed between the electrode interface layer 548 and the lower electrode 520. It is preferable that the under coating layer 550 has rectifying characteristics from the view point of a dark current and the reduction of a leak current. The under coating layer 550 preferably has an electron blocking property when a positive bias is applied to the upper electrode 518 and preferably has a hole blocking property when a negative bias is applied to the upper electrode 518.

It is preferable that the under coating layer has a resistivity of $10^8$ Ωcm or more and a film thickness of 0.01 μm to 10 μm. The layer having the electron blocking property, that is, the electron injection blocking layer is preferably a layer, which is composed of a composition of $Sb_2S_3$, SbTe, ZnTe, CdTe, SbS, AsSe, $As_2S_3$ or an organic polymer layer. A hole transport polymer such as PVK or a film composed of an insulation polymer such as polycarbonate, polystyrene, polyimide, polycycloolefin mixed with NPD, TPD is preferably used as the organic polymer layer.

A film of CdS, $CeO_2$ or an organic polymer layer is preferable as the layer having the hole blocking property, that is, as the hole injection blocking layer. A film, which is composed of an insulation polymer such as polycarbonate, polystyrene, polyimide, polycycloolefin mixed with carbon clusters of C60 (fullerene), C70 may be preferably used as the organic polymer layer.

A thin insulation polymer layer may be also preferably used, and parylene, polycarbonate, PVA, PVP, PVB, a polyester resin and an acrylic resin such as polymethylmethacrylate are preferable. A film thickness at the time is preferably 2 μm or less and more preferably 0.5 μm or less.

<Upper Coating Layer>

The upper coating layer 552 may be formed between the recording photoconductive layer 542 and the upper electrode (voltage application electrode) 518. When the electrode interface layer (crystallization prevention layer (C layer)) 548 is employed, the upper coating layer 552 is preferably formed between the electrode interface layer 548 and the upper electrode 518. It is preferable that the upper coating layer 552 has the rectifying characteristics from the view point of the dark current and the reduction of the leak current.

The upper coating layer 552 preferably has the hole blocking property when the positive bias is applied to the upper electrode 518 and preferably has the electron blocking property when the negative bias is applied to the upper electrode 518. It is preferable that the upper coating layer has a resistivity of $10^8$ Ωcm or more and a film thickness of 0.01 μm to 10 μm.

The layer having the electron blocking property, that is, the electron injection blocking layer is preferably a layer, which is composed of a composition of $Sb_2S_3$, SbTe, ZnTe, CdTe, SbS, AsSe, $As_2S_3$ or an organic polymer layer. A hole transport polymer such as PVK or a film composed of an insulation polymer such as polycarbonate, polystyrene, polyimide, polycycloolefin mixed with NPD, TPD is preferably used as the organic polymer layer.

A film of CdS, $CeO_2$ or an organic polymer layer is preferable as the layer having the hole blocking property, that is, as the hole injection blocking layer. A film, which is composed of an insulation polymer such as polycarbonate, polystyrene, polyimide, polycycloolefin mixed with carbon clusters of C60 (fullerene), C70 may be preferably used as the organic polymer layer.

A thin insulation polymer layer may be also preferably used, and parylene, polycarbonate, PVA, PVP, PVB, a polyester resin and an acrylic resin such as polymethylmethacrylate are preferable. A film thickness at the time is preferably 2 μm or less and more preferably 0.5 μm or less.

Next, the upper electrode 518 will be explained.

<Upper Electrode>

A metal thin film is preferably used as the upper electrode 518 formed on the upper surface of the recording photoconductive layer 542. It is sufficient to form the upper electrode 518 with a metal such as Au, Ni, Cr, Au, Pt, Ti, Al, Cu, Pd, Ag, Mg, MgAg 3-20% alloy, a Mg—Ag intermetal compound, MgCu 3-20% alloy, Mg—Cu intermetal compound.

In particular, Au, Pt, and the Mg—Ag intermetal compound are preferably used. When, for example, Au is used, the thickness of the upper electrode 518 is preferably 15 nm or more to 200 nm or less and more preferably 30 nm or more to 100 nm or less. When, for example, the MgAg 3-20% alloy is used, the thickness of the upper electrode 518 is preferably 100 nm or more to 400 nm or less.

Although the upper electrode 518 may be made by any optional method, it is preferably made by vapor deposition employing a resistance heating system. For example, after a metal ingot is melted in a boat by the resistance heating system, a shutter is opened, the metal is vapor-deposited for 15 seconds, and then cooled once. The upper electrode 518 may be formed by repeating the vapor deposition a plurality of times until the resistance value thereof is sufficiently lowered.

Here, although examples of preferable layer arrangements will be shown below, the invention is not limited thereto. FIG. 3 shows a model view of the cross section of the layer arrangements.

<Arrangement 1>

As shown in FIGS. 1 and 2, a layer arrangement was created on the lower radiation detecting substrate 524 in the following sequence. A flat IZO electrode having a surface roughness Ra<1 nm was used as the lower electrode 520.

Under coating layer 550: $CeO_2$, thickness: 20 nm

Under electrode interface layer 548: amorphous selenium doped with As of 10% and 500 ppm of LiF, thickness: 0.1 μm Reading photoconductive layer 546: amorphous selenium, thickness: 7 μm Charge accumulation layer 544: $As_2Se_3$, thickness: 1 μm Recording photoconductive layer 542: amorphous selenium containing 0.001 ppm of Na, thickness: 200 μm Upper electrode interface layer 548: amorphous selenium doped with 10% of As, thickness: 0.2 μm Upper coating layer 552: $Sb_2S_3$, thickness: 0.5 μm Upper electrode 518: Au, thickness: 70 nm <Arrangement 2>

As shown in FIGS. 1 and 2, a layer arrangement was created on the lower radiation detecting substrate 524 in the following sequence. A flat IZO electrode having a surface roughness Ra<1 nm was used as the lower electrode 520.

Under coating layer 550: nil

Under electrode interface layer 548: amorphous selenium doped with 3% of As, thickness: 0.15 μm Reading photoconductive layer 546: amorphous selenium, thickness: 15 μm Charge accumulation layer 544: $As_2Se_3$, thickness: 2 μm Recording photoconductive layer 542: amorphous selenium containing 0.001 ppm of Na, thickness: 180 μm Upper electrode interface layer 548: amorphous selenium doped with 10% of As, thickness: 0.1 μm Upper coating layer 552: $Sb_2S_3$, thickness: 0.2 μm Upper electrode 518: Au, thickness: 150 nm <Arrangement 3>

As shown in FIGS. 1 and 2, a layer arrangement was created on the lower radiation detecting substrate 524 in the following sequence. A flat IZO electrode having a surface roughness Ra<1 nm was used as the lower electrode 520.

Under coating layer 550: $CeO_2$, thickness: 30 nm

Lower electrode interface layer 548: amorphous selenium doped with 6% of As, thickness: 0.25 μm Reading photoconductive layer 546: amorphous selenium, thickness: 10 μm Charge accumulation layer 544: $As_2Se_3$, thickness: 0.6 μm Recording photoconductive layer 542: amorphous selenium containing 0.001 ppm of Na, thickness: 230 μm Upper electrode interface layer 548: amorphous selenium doped with 10% of As, thickness: 0.3 μm Upper coating layer 552: $Sb_2S_3$, thickness: 0.3 μm Upper electrode 518: Au, thickness: 100 nm <Charge Output Amplifier>

In the exemplary embodiment, charges are subjected to AD conversion after they are amplified by an amplifier. FIG. 4 is a block diagram showing an arrangement of the charge output amplifier and how an image processing apparatus 150 disposed outside of the radiation detecting substrate 500 are connected to the charge taking-out amplifier.

A charge amplifier IC511 as the charge output amplifier has a multiplicity of charge amplifiers 33a connected to each of elements 15a of the radiation detecting substrate 500, sample holds (S/H) 33b, and a multiplexer 33c for multiplexing the signals from the respective sample holds 33b.

The current, which flows out from the lower electrode, is converted into voltages by the respective charge amplifiers 33a, the voltages are sample-held by the sample holds 33b at predetermined timing, and the sample-held voltages corresponding to the respective elements 15a are sequentially output from the multiplexer 33c so that they are sequentially switched in the sequence in which the elements 15a are disposed (corresponding to a part of a main scan).

The signals sequentially output from the multiplexer 33c are input to a multiplexer 31c disposed on a print substrate 31 and further sequentially output from the multiplexer 31c so that the voltages corresponding to the respective elements 15a are switched in the sequence in which the elements 15a are disposed, thereby the main scan is completed.

The signals sequentially output from the multiplexer 31c are converted into digital signals by an A/D conversion unit 31a and stored in a memory 31b. The image signals, which are stored in the memory 31b once, are sent to the external image processing device 150 through a signal cable, subjected to appropriate image processing in the image processing device 150, uploaded to a network 151 together with radiographic information, and sent to a server or a printer.

<Image Acquisition Sequence>

Figure 5:
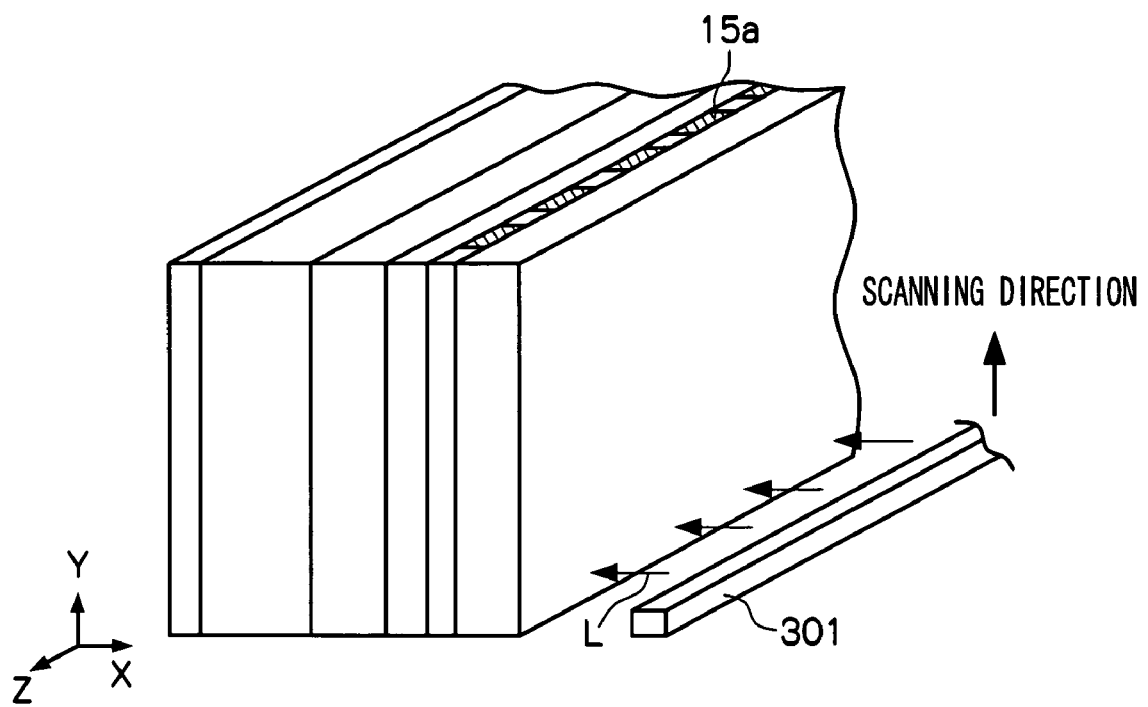
FIG. 5 is a schematic view showing the scan of line light as reading light.

An image formation sequence of an image recording/reading system is basically composed of a process for accumulating latent image charges by radiating recording light (for example, X-rays) while a high voltage is applied and a process for reading out the latent image charges by radiating reading light after the application of the high voltage is completed. Although the reading light L is most optimally radiated by a method of scanning a line light source 301 in an electrode direction (refer to FIG. 5), another method may be also employed.

Further, a process for sufficiently erasing the latent image charges which are left without being read may be combined with the above process when necessary. The erasure process is performed by radiating erasure light to the entire surface of a panel. In this case, the light may be radiated to the entire surface of the panel at a time or the entire surface may be scanned with line light or spot light, and these process are performed after the reading process or/and the latent image accumulation process are performed. When the erasure light is radiated, erasure efficiency may be increased in combination with the application of the high voltage. Further, the charges (dark current charges), which are generated by the dark current when the high voltage is applied, may be erased by performing "pre-exposure" before the recording light is radiated after the high voltage is applied.

Further, it is known that various charges are also accumulated to an electrostatic recording member by reasons other than the above ones before the recording light is radiated. Since these remaining signals affect the image information signal to be output next as a remaining image phenomenon, it is preferable to reduce them by correction.

A method of adding a remaining image reading process to the above image recording/reading process is effective for correcting the remaining image signal. The remaining image recording process is performed by reading a "remaining image" by the reading light after only the high voltage is applied without radiating the recording light, and the remaining image signal may be corrected by subtracting the "remaining image" signal from the "recording image" signal after the "remaining image" signal is subjected to appropriate processing. The remaining image reading process is performed before or after the image recording/reading process. Further, an appropriate erasure process may be combined before or/and after the remaining image reading process.

(Arrangement for Covering Upper Electrode and Radiation Detecting Layer)

Next, an arrangement for covering the upper electrode and the radiation detecting layer will be explained.

Figure 6:
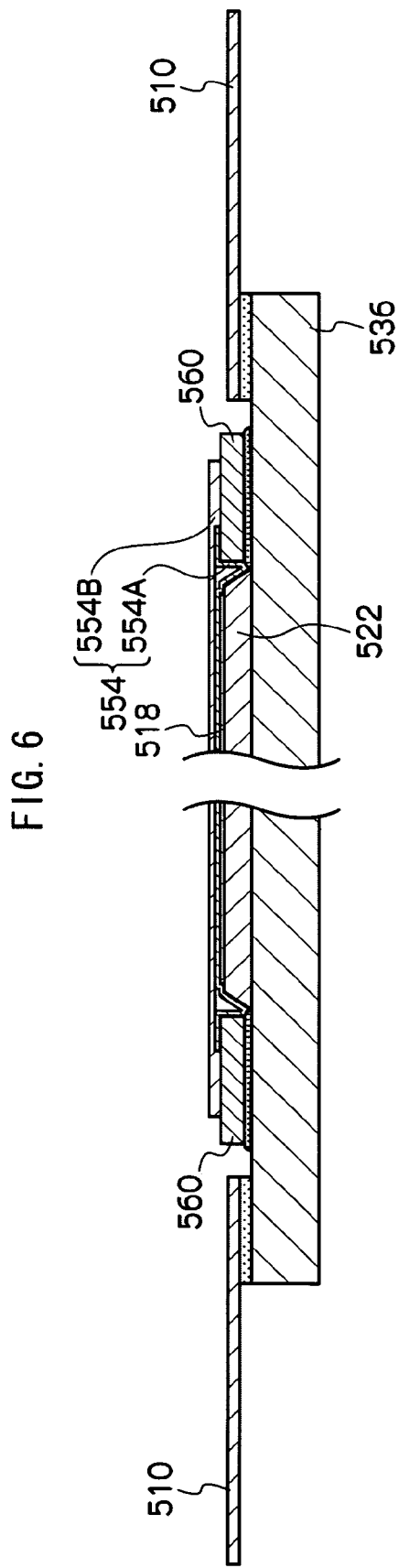
FIG. 6 is a sectional view taken along the line 6-6 of FIG. 1 for showing an arrangement for covering an upper electrode and an electromagnetic radiation detecting layer.
Figure 7:
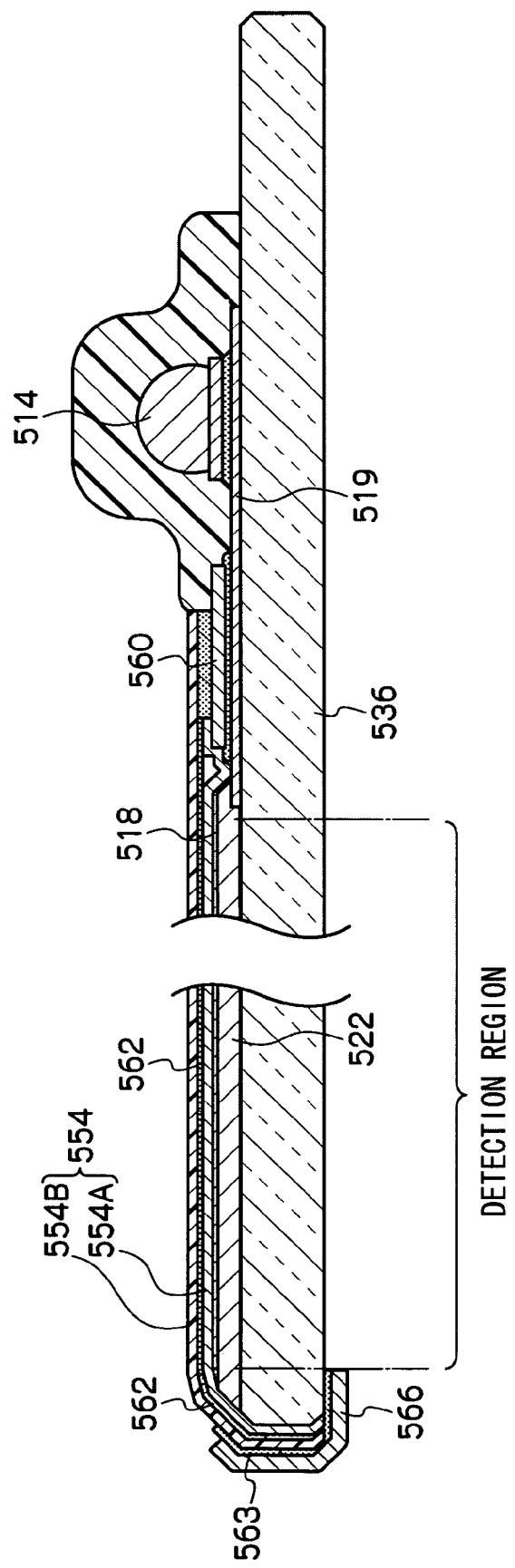
FIG. 7 is a sectional view taken along the line 7-7 of FIG. 1 for showing an arrangement for covering the upper electrode and the electromagnetic radiation detecting layer.
Figure 8:
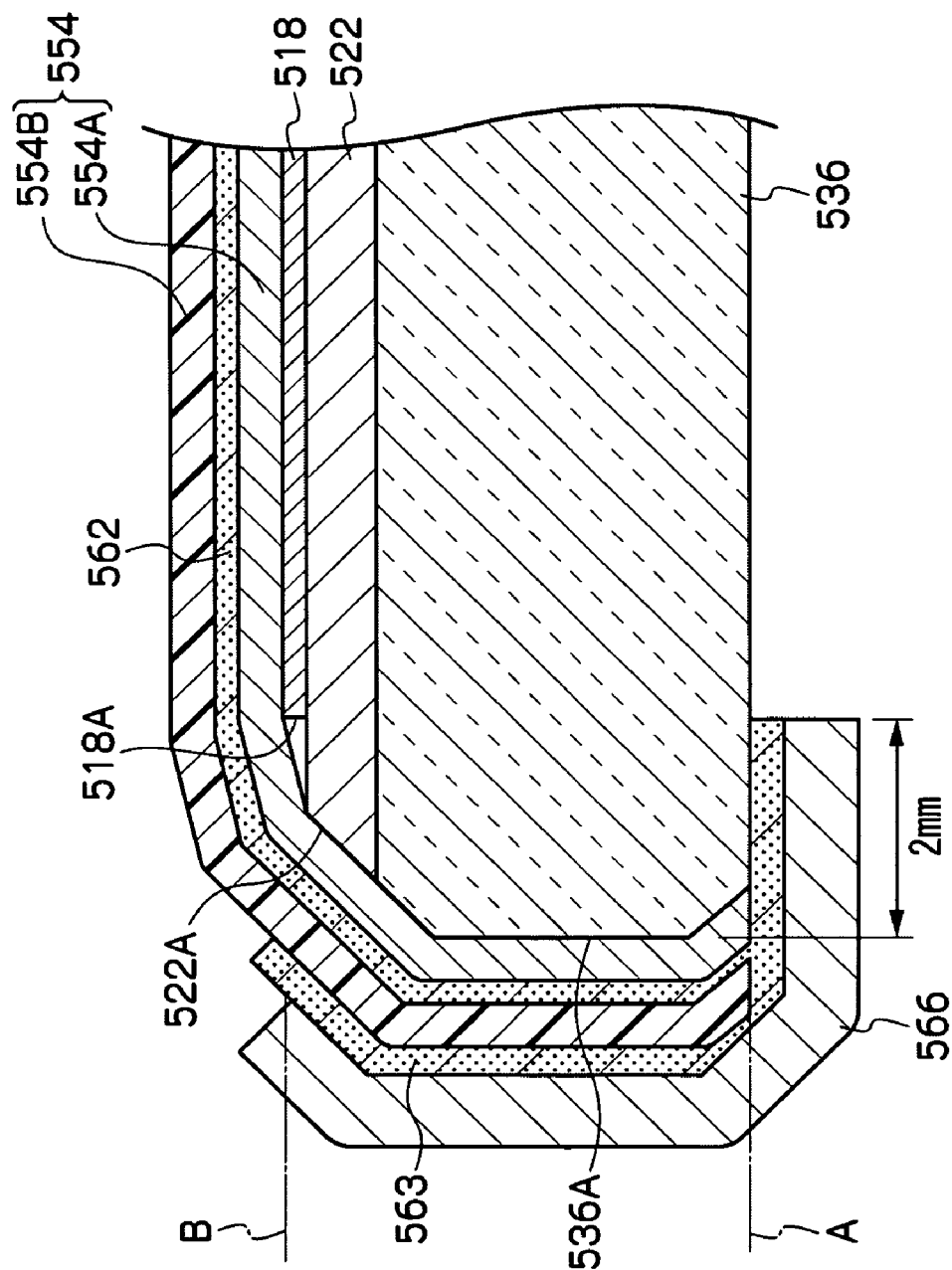
FIG. 8 is an enlarged view showing the end portion of a patient on a breast wall side in enlargement in the arrangement shown in FIG. 7.

FIG. 6 is a sectional view taken along the line 6-6 of FIG. 1 for showing an arrangement for covering an upper electrode and an radiation detecting layer. FIG. 7 is a sectional view taken along the line 7-7 of FIG. 1 for showing an arrangement for covering the upper electrode and the radiation detecting layer. FIG. 8 is an enlarged view showing an end portion at a breast wall side of a patient in the arrangement shown in FIG. 7.

In the radiation detecting substrate 500 according to the exemplary embodiment, a high voltage of several kilovolts is applied to the upper electrode 518 to form a latent image to the radiation detecting device by radiation thereto. When the upper electrode 518 is exposed to the atmosphere, a creeping discharge is generated. To prevent the creeping discharge in the upper electrode 518, an insulation treatment must be applied to the upper surface of the upper electrode 518.

Since the insulation treatment must provide an electrode surface with a structure which entirely prevents the electrode surface from being in contact with the atmosphere, the electrode surface is closely covered with an insulating member. Further, the insulating member must have insulation breakdown strength exceeding the applied voltage. Furthermore, the insulating member must be a member which does not prevent transmission of the radiation in view of the function of the radiation detector. It is preferable to use an insulation polymer as materials for satisfying the required covering property, insulation breakdown strength, and high radiation transmittance. The insulation polymer is vapor-deposit or the insulation polymer solvent is coated for the insulation treatment.

Exemplified as a specific example of the manufacturing method is to form a layer with a room-temperature setting type epoxy resin, a polycarbonate resin, a polyvinyl butyral resin, a polyvinyl alcohol resin, an acrylic resin, and a polyparaxylylene derivative by a CVD method. A method of forming a layer with the room-temperature setting type epoxy resin and the polyparaxylylene derivative by the CVD method is preferable and the method of forming a layer with the polyparaxylylene derivative by the CVD method is especially preferable. A preferable film thickness is 10 µm or more to 1000 µm or less, and a more preferable film thickness is 20 µm or more to 100 µm or less.

An insulation film having a very high unevenness covering property may be obtained from a polyparaxylylene film without applying thermal stress to a member to be covered with the film because the polyparaxylylene film may be formed at a room temperature. However, since the polyparaxylylene film is chemically stable, the close contact property thereof with the member to be covered with the film is ordinarily not good in many cases. There are ordinarily known a physical treatment and a chemical treatment using a coupling agent, corona discharge, a plasma treatment, ozone rinse, an acid treatment, surface roughing as a treatment applied to the member to be covered with the film before the polyparaxylylene film is formed to improve the close contact property of the film with the member to be covered with the film, and these treatments may be used. In particular, a preferable method for improving the close contact property of the polyparaxylylene film with the member to be covered with the film is to form the polyparaxylylene film after a silane coupling agent or a silane coupling agent diluted with alcohol as necessary is applied to at least the portion where it is desired to improve the close contact property of the portion with the member to be covered with the film.

Further, it is preferable to perform a vapor proof treatment to prevent the time degradation of the radiation detecting device. Specifically, the radiation detecting device is covered with a vapor proof member. A simple resin such as the insulation polymer does not have a sufficient function as the vapor proof member, and an arrangement having at least an inorganic material layer composed of a glass, an aluminum laminate film may be effectively used. However, since the glass attenuates transmission of radiation, the vapor proof member is preferably a thin aluminum laminate film. There is, for example, a vapor proof member laminated with PET 12 µm/rolled aluminum 9 µm/nylon 15 µm which is generally used as a vapor proof packing material.

The thickness of aluminum is preferably 5 µm or more to 30 µm or less, the thickness of PET and the thickness of nylon on and under the aluminum are preferably 10 µm or more to 100 µm or less, respectively. Since the attenuation of the film caused by X-rays is about 1%, the film is optimum to satisfy both a vapor proof effect and transmission of X-rays.

Further, it is preferable to keep the moisture environment of the device to 30% or less and it is more preferable to keep the moisture environment thereof to 10% or less by forming the protection film.

In the exemplary embodiment, as shown in FIG. 6, the upper electrode 518 and the radiation detecting layer 522 are covered with a protection layer 554 composed of a first protection film 554A formed of the insulation member noted above and a second protection film 554B formed of the vapor proof member noted above.

In the radiation detecting substrate 500 according to the exemplary embodiment, the distance from a detection region (image region) to the end surface of the substrate on the breast wall side is set to 2 mm. Further, as shown in FIGS. 6 and 7, a rib member 560 surrounding the radiation detecting layer 522 from three sides except the breast wall side is attached on a glass substrate 536 by a bonding agent or an adhesive agent. The rib member 560 is formed of, for example, glass.

In the exemplary embodiment, as shown in FIGS. 6 and 7, first, the first protection film 554A composed of polyparaxylylene is formed on the upper electrode 518. Next, the second protection film 554B as the vapor proof film composed of PET is bonded on the first protection film 554A by a joint material 562 such as a bonding agent, an adhesive agent, and the like. With this arrangement, the upper electrode 518 and the radiation detecting layer 522 are sealed by the glass substrate 536, the rib member 560, and the protection layer 554.

The radiation detector according to the exemplary embodiment uses the amorphous selenium. Since there is a possibility that a function for forming a latent image may not be obtained at a high temperature of 40° C. or more because the amorphous selenium is crystallized, it is desirable not to heat the device in the production process.

Accordingly, a room-temperature setting type or UV thermosetting type epoxy bonding agent, an acryl adhesive agent, or a silicone adhesive agent are desirable as the joint material 562. When the room-temperature setting type epoxy bonding agent is used, for example, the second protection film 554B is uniformly pressed and fixed from the upper surface thereof, and the bonding agent is set after it is left in this state for 12 hours or longer in a room temperature environment. After the bonding agent is set, the pressed state is released, thereby a hermetically sealed structure is completed.

Note that, when polyparaxylylene is used as the first protection film 554A, since the polyparaxylylene is very stable chemically, the bonding property (adhesion property) thereof to other member through a bonding agent (adhesive agent) is generally poor. However, the bonding property (adhesion property) thereof may be improved by radiating ultraviolet rays thereto before it is bonded (adhered). Although a necessary radiation time is optimized depending on the wavelength and the number of watts of an ultraviolet ray source to be used, a low-pressure mercury lamp of 1 W to 50 W is preferably used, and it is preferably to radiate the ultraviolet rays from 1 minute to 30 minutes.

In the exemplary embodiment, as shown in FIG. 8, the protection layer 554 composed of the first protection film 554A and the second protection film 554B is formed on the upper electrode 518 as well as the end portion thereof extends to the end surface of the glass substrate 536. The end surface of the glass substrate 536 corresponds to the breast wall side of a patient.

Specifically, the end portion of the protection layer 554 is formed along the end surface 518A of the upper electrode 518, the end surface 522A of the radiation detecting layer 522, and the end surface 536A of the glass substrate 536 and is formed to the lower end of the end surface 536A of the glass substrate 536 (position of a chain double-dashed line A of FIG. 8).

Note that the lower end of the protection layer 554 need not be positionally in coincidence with the lower end of the glass substrate 536 (position shown by the chain double-dashed line A of FIG. 8), and the lower end of the protection layer 554 may be dislocated up and down with respect to the lower end of the end surface 536A of the glass substrate 536.

Further, a reinforcing film 566 as a reinforcement member for covering the end portion of the protection layer 554 is bonded from the lower surface of the glass substrate 536 to the surface of the protection layer 554 by a joint material 563.

Specifically, the reinforcing film 566 is formed along the protection layer 554. The upper end of the reinforcing film 566 reaches the upper end of the upper electrode 518 (the position shown by a chain double-dashed line B of FIG. 8) so that the reinforcing film 566 is formed outside of the detection region (image region).

Further, a room-temperature setting type or UV thermosetting type epoxy bonding agent, an acryl adhesive agent, or a silicone adhesive agent, for example, is used as the joint material 563 likewise the joint material 562.

Note that it is sufficient that the upper end of the reinforcing film 566 may reach at least the upper end of the glass substrate 536 or the upper end of the radiation detecting layer 522. Further, the upper end of the reinforcing film 566 may be further extended beyond the upper end of the upper electrode 518 outside of the detection region (image region).

The end of the reinforcing film 566 formed on the lower surface of the glass substrate 536 is provided at a position 2 mm away from the end surface 536A of the glass substrate 536 so that the reinforcing film 566 is formed outside of the detection region.

As described above, the protection layer 554 and the reinforcing film 566 are bonded alternately in the exemplary embodiment.

A flexible member, which may be deformed along a surface on which the reinforcing film 566 is formed, that is, on the surface on which the reinforcing film 566 is bonded, is used as the reinforcing film 566. A PI tape, and a reinforced adhesive tape of PET and the like may be used as the flexible member.

(Operation/Working Effect of Radiation Detector According to Exemplary Embodiment)

Next, the operation/working effect of the radiation detector will be explained.

According to the configuration, the protection layer 554 covers the upper electrode 518 formed on the upper surface of the radiation detecting layer 522 disposed on the glass substrate 536, and the end portion of the protection layer 554 extends to the end surface of the glass substrate 536.

The reinforcing film 566 formed from the lower surface of the glass substrate 536 to the surface of the protection layer 554 covers the end portion of the protection layer 554. With this arrangement, the adhesion property of the end portion of the protection layer 554 to the end surface of the glass substrate 536 may be improved and the end portion of the protection layer 554 is unlikely to be rolled up even if time elapses, thereby the protection layer 554 may be suppressed from being broken.

Further, in the exemplary embodiment, since the reinforcing film 566 is formed outside of the detection region in which incident radiation is detected, the reinforcing film 566 does not interfere with detection of the radiation.

Further, in the exemplary embodiment, since the reinforcing film 566 is formed of the flexible member, the reinforcing film 566 may be liable to be bonded on the surface, and since the reinforcing film 566 follows the irregular state of the surface, the adhesion property thereof to the bonded surface may be improved.

Note that a pre-formed member, which is previously formed along the surface on which the reinforcing film 566 is to be formed, that is, which is previously formed along the surface on which the reinforcing film 566 may be used as the reinforcing film 566.

Figure 9:
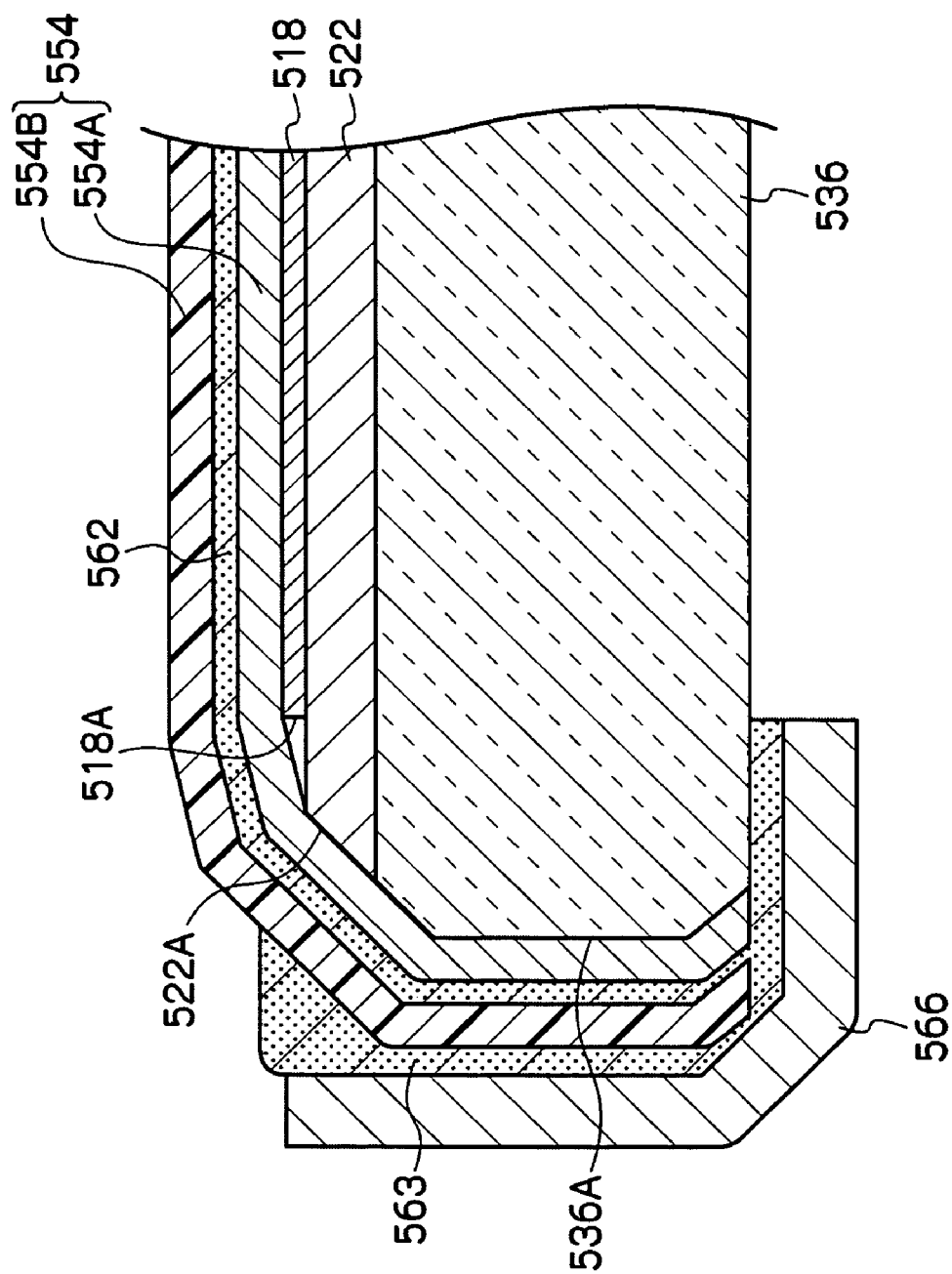
FIG. 9 is a view showing a modification using a formed member previously formed along a to-be-bonded surface on which a reinforcement film is bonded.

A reinforcement member 567 such as PET, ABS, and glass is used as the pre-formed member, and the reinforcement member 567 is previously formed along the surface in an L-shaped cross section as shown in FIG. 9. According to the arrangement, the rigidity of the bonded member may be increased than that of the reinforcing film 566 and members may be easily handled in manufacturing therefore, the radiation detecting substrate 500 may be manufactured in a simplified manner.

Figure 10:
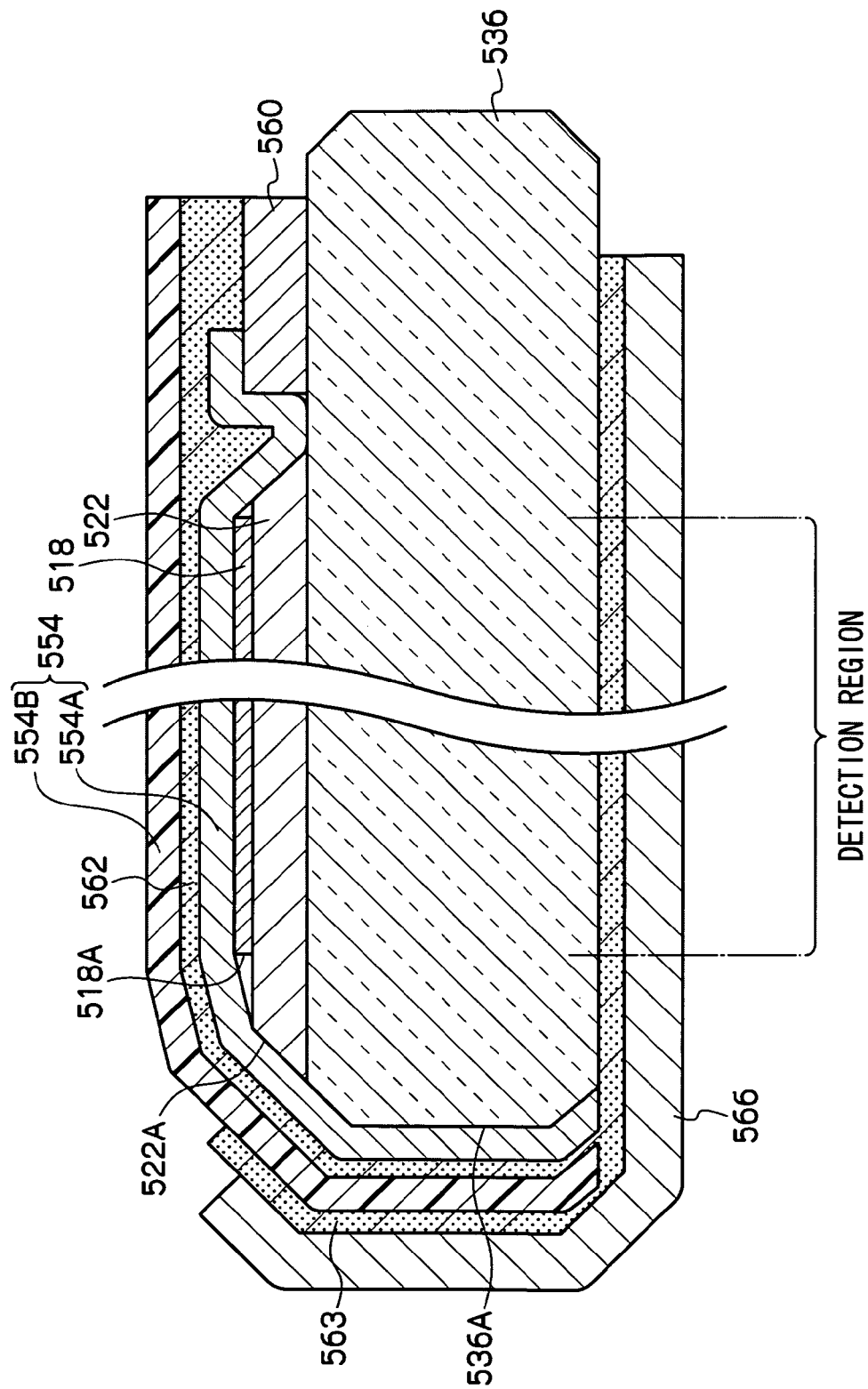
FIG. 10 is a view showing a modification in which the reinforcement film is formed on a detection region on the lower surface of a glass substrate.

Further, since it is not necessary to radiate light from the lower surface of the reinforcing film 566 in the radiation detector using the electric reading system to be described later, the reinforcing film 566 may be formed in the detection region of the lower surface of the glass substrate 536 as shown in FIG. 10. With this arrangement, a bonding area may be secured.

Further, the reinforcing film 566 may be formed in the detection region on the upper electrode 518 in the radiation detector using the electric reading system and in the radiation detector using the optical reading system. The reinforcing film 566 may be formed in the detection region on the lower surface of the glass substrate 536 in the radiation detector using the optical reading system. In this case, although recording light and reading light (electromagnetic radiation) is changed when it passes through the reinforcing film 566, this affection may be coped with by correcting the change of the light passing through the reinforcing film 566 when the radiation is detected. Further, in the arrangement, it is desirable to uniformly bond the reinforcing film 566 on the overall surface of the detection region in consideration of easiness of correction.

Figure 11:
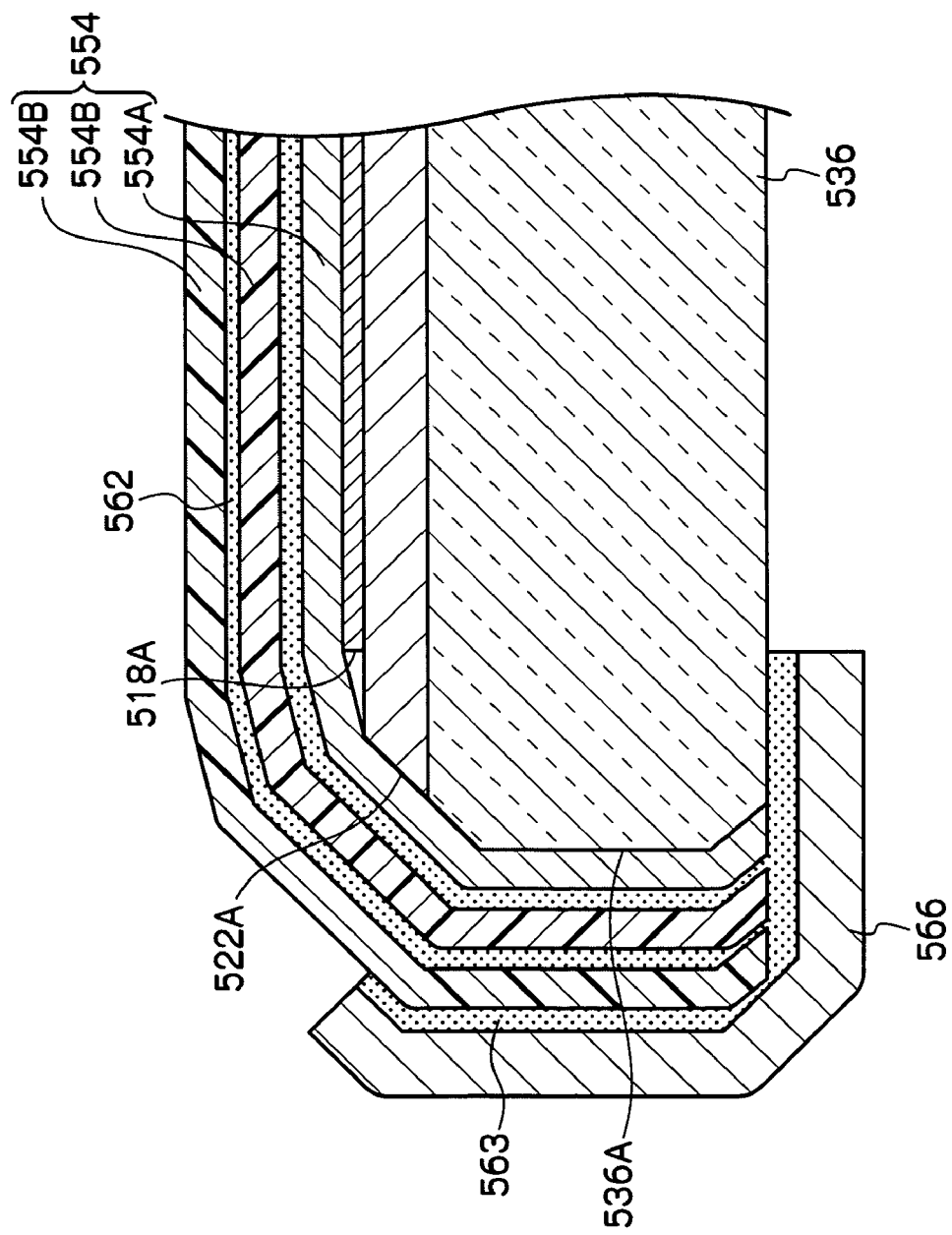
FIG. 11 is a view showing a modification in which a second protection film is formed of two layers.

Further, the second protection film 554B may be formed of two layers so that the protection layer 554 may be formed of three-layer structure as shown in FIG. 11. According to the arrangement, since the respective layers of the second protection film 554B can be formed thin while keeping a function as the protection film, bending processing may be performed easily when it is bonded.

Note that, the protection layer 554 is not limited to the two-layered structure and the three-layered structure, it may be composed of one layer, four-layer or more.

(Configuration of Radiation Detector Using Electric Reading System)

Figure 12:
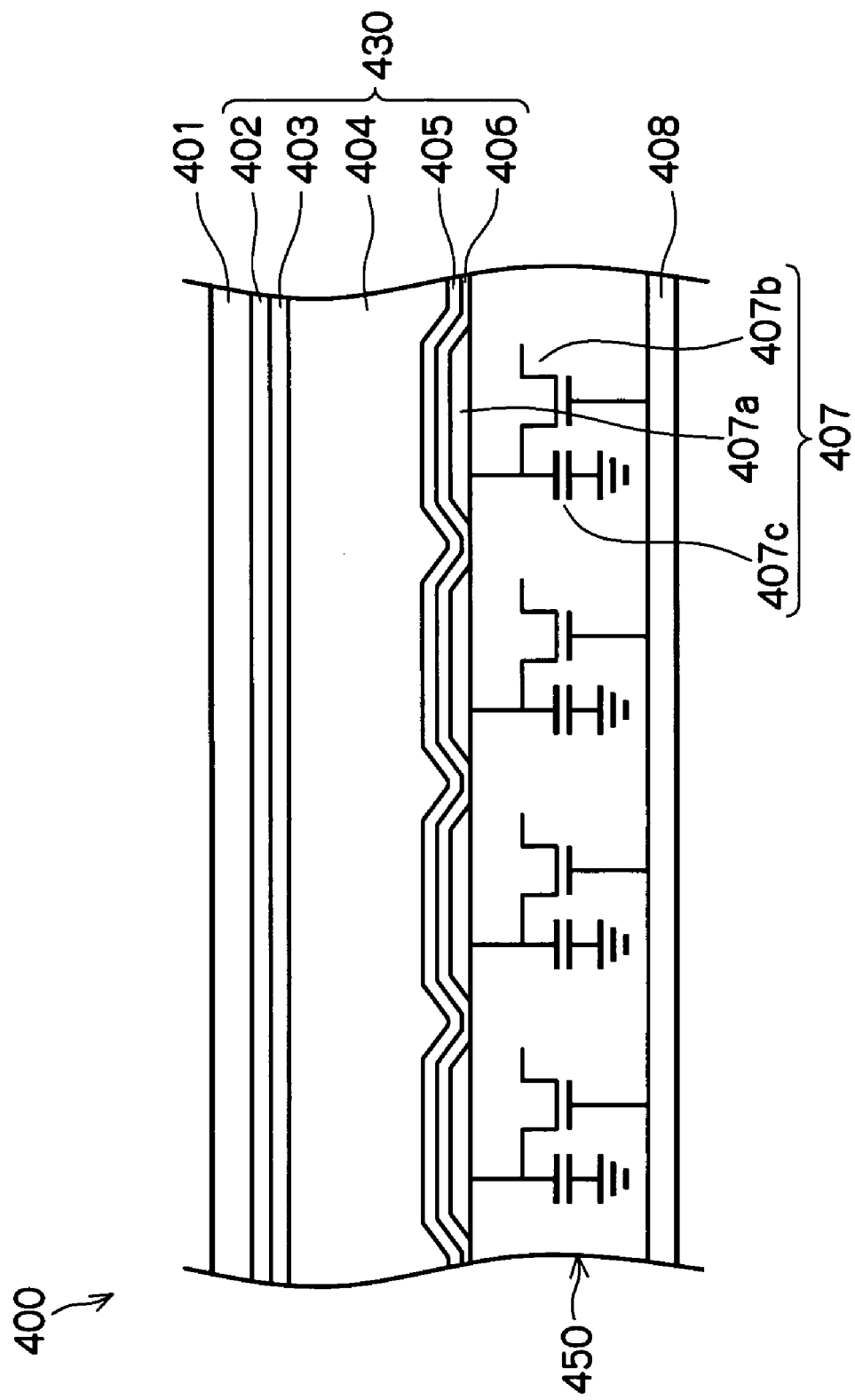
FIG. 12 is a schematic view showing an arrangement of an electromagnetic radiation detector using an electric reading system.

The invention may be also applied to the radiation detector using the electric reading system and applied according to arrangement for covering the upper electrode and the radiation detecting layer. Here, the radiation detector using the electric reading system will be explained. FIG. 12 is a schematic view showing an arrangement of the radiation detector using the ELECTRIC READING system.

As shown in FIG. 12, the electromagnetic radiation detector 400 according to the exemplary embodiment includes a photoconductive layer 404 exhibiting electromagnetic wave conductivity as a charge conversion layer for generating charges when X-rays are incident thereon. In the state in which a bias voltage is applied, an amorphous material, which has high dark resistor, exhibits good electromagnetic wave conductivity to irradiation of X-rays, and may be formed to a film having large area by a vacuum vapor deposition method at a low temperature, is preferred and an amorphous Se (a-Se) film is used as the photoconductive layer 404. Further, since a material composed of amorphous Se to which As, Sb, and Ge are doped is excellent in heat stability, it is a preferable material.

A single bias electrode 401 is layered above the photoconductive layer 404 as an upper electrode for applying a bias voltage to the photoconductive layer 404. Gold (Au), for example, is used in the bias electrode 401.

A plurality of charge collection electrodes 407a are formed under the photoconductive layer 404 as a lower electrode. As shown in FIG. 12, Each of the charge collection electrodes 407a is connected to a charge accumulation capacitance 407c and a switch device 407b.

Further, an intermediate layer is formed between the photoconductive layer 404 and the bias electrode 401. The intermediate layer is a layer existing between the upper electrode and the charge conversion layer and may act also as a charge injection blocking layer (which includes accumulation of charges and formation of a diode). Although a resistor layer and an insulation layer may be used as the charge injection blocking layer, a hole injection blocking layer, which blocks injection of holes but it acts a conductor to electrons, and an electron injection blocking layer, which blocks injection of electrons but it acts a conductor to holes, are preferably used as the charge injection blocking layer. $CeO_2$, ZnS, and $Sb_2S_3$ may be used as the hole injection blocking layer. ZnS is preferably used because it may be formed at a low temperature. Se, CdTe, which are doped with $Sb_2S_3$, CdS, Te and organic compounds may be used as the electron injection blocking layer. Note that $Sb_2S_3$ may be used as the hole injection blocking layer and the electron injection blocking layer depending on the thickness thereof. In the exemplary embodiment, since the bias electrode is a positive polarity, a hole injection blocking layer 402 is formed as the intermediate layer. Further, an electron injection blocking layer 406 is formed between the photoconductive layer 404 and the charge collection electrodes 407a although it is not the intermediate layer of the invention.

Further, crystallization prevention layers 403 and 405 are disposed between the hole injection blocking layer 402 and the photoconductive layer 404 and between the electron injection blocking layer 406 and the photoconductive layer 404, respectively. GeSe, $GeSe_2$, $Sb_2Se_3$, and $a-As_2Se_3$, Se—As, Se—Ge, Se—Sb compounds may be used as the crystallization prevention layers 403 and 405.

Note that the radiation detecting layer 430 is formed with the hole injection blocking layer 402, the crystallization prevention layers 403, the photoconductive layer 404, the crystallization prevention layers 405, and the electron injection blocking layer 406. An active matrix layer 407 is formed with the charge collection electrodes 407a, the switch device 407b, and the charge accumulation capacitance 407c, and an active matrix substrate 450 is composed of a glass substrate 408 and the active matrix layer 407.

Figure 13:
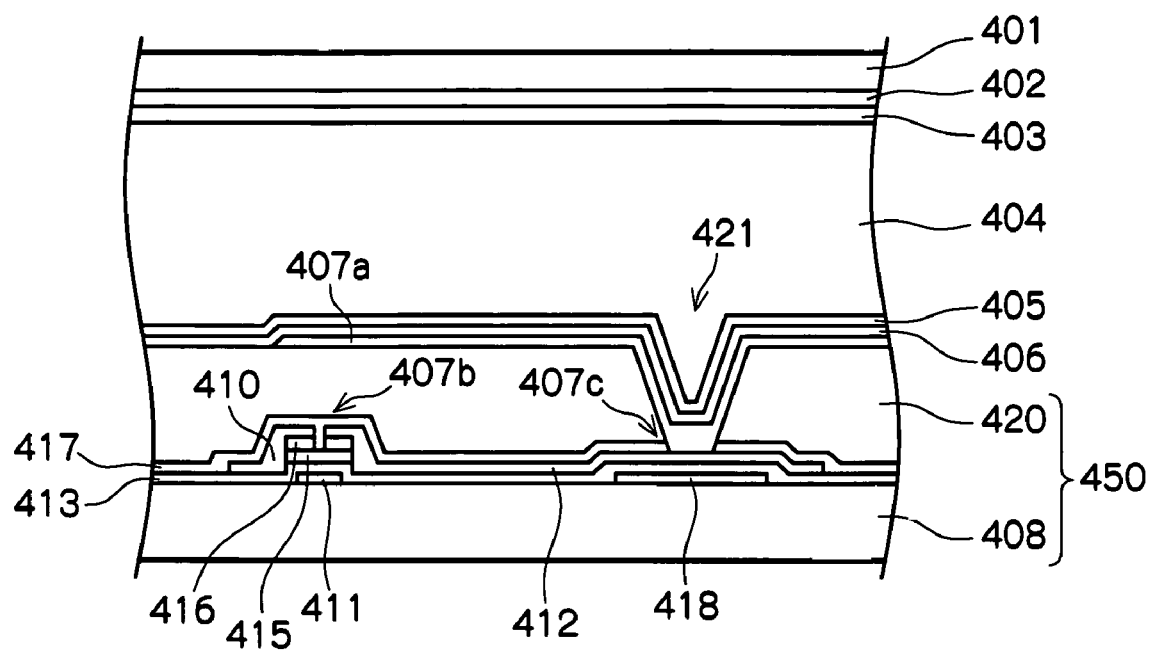
FIG. 13 is a sectional view showing a structure of one pixel unit of the electromagnetic radiation detector using the electric reading system.
Figure 14:
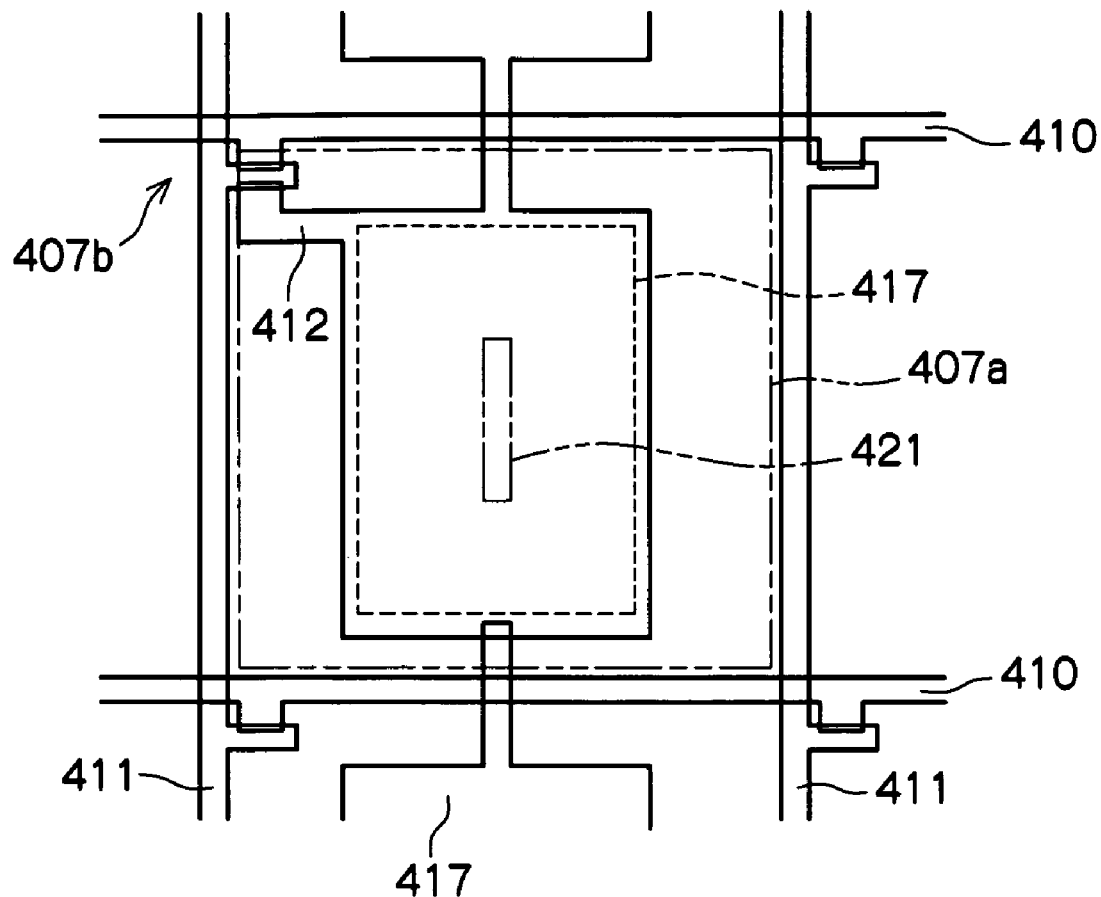
FIG. 14 is a plan view showing a structure of the one pixel unit of the electromagnetic radiation detector using the electric reading system.

FIG. 13 is a sectional view showing a structure of one pixel unit of the radiation detector 400, and FIG. 4 is a plan view thereof. The size of one pixel shown in FIGS. 13 and 14 is about 0.1 mm×0.1 mm to about 0.3 mm×0.3 mm, and the overall radiation detector is composed of about 500×500 to about 3000×3000 pieces of the pixels disposed in a matrix configuration.

As shown in FIG. 13, the active matrix substrate 450 includes the glass substrate 408, a gate electrode 411, a charge accumulation capacitance electrode (hereinafter, referred to as Cs electrode) 418, a gate insulation film 413, drain electrodes 412, a channel layer 415, a contact electrode 416, a source electrode 410, an insulation protection film 417, an interlayer insulation film 420, and the charge collection electrodes 407a.

Further, the switch device 407b is composed of a thin film transistor (TFT) formed of the gate electrode 411, the gate insulation film 413, the source electrode 410, the drain electrode 412, the channel layer 415, the contact electrode 416 and so on. The charge accumulation capacitance 407c is composed of the Cs electrode 418, the gate insulation film 413, the drain electrode 412 and so on.

The glass substrate 408 is a support substrate, and a non-alkali glass substrate (for example, #1737 manufactured by Corning Incorporated), for example, may be used as the glass substrate 408. As shown in FIG. 14, the gate electrode 411 and the source electrode 410 are electrode wirings disposed in a grid-shape, and the switch device 407b composed of the thin film transistor (TFT) is formed to each of the intersecting points thereof.

The source and the drain of the switch device 407b are connected to the source electrode 410 and the drain electrode 412, respectively. The source electrode 410 has a linear wire portion as a signal line and an extended portion constituting the switch device 407b, and the drain electrode 412 is disposed so as to connect the switch device 407b to the charge accumulation capacitance 407c.

The gate insulation film 413 is composed of SiNx, SiOx. The gate insulation film 413 is formed to cover the gate electrode 411 and the Cs electrode 418, and the portion of the gate insulation film 413 located on the gate electrode 411 acts as a gate insulation film in the switch device 407b, and the portion thereof located on the Cs electrode 418 acts as a dielectric layer in the charge accumulation capacitance 407c. That is, the charge accumulation capacitance 407c is formed in the superimposed region of the Cs electrode 418 and the drain electrode 412 while the Cs electrode 418 is formed in the same layer as the gate electrode 411. Note that an anode oxide film formed by subjecting the gate electrode 411 and the Cs electrode 418 to anode oxidation may be also used as the gate insulation film 413 in addition to the SiNx and the SiOx.

Further, the channel layer (i layer) 415 is a channel portion of the switch device 407b and a current path for connecting the source electrode 410 to the drain electrode 412. The contact electrode (n+ layer) 416 causes the source electrode 410 to come into contact with the drain electrode 412.

The insulation protection-film 417 is formed on approximately the overall surface (approximately the overall region) of the source electrode 410 and the drain electrode 412, that is, the glass substrate 408. With this arrangement, the insulation protection film 417 protects the drain electrode 412 and the source electrode 410 as well as electrically insulates them. Further, the insulation protection film 417 has a contact hole 421 at a predetermined position, that is, in a portion in which the drain electrode 412 faces the Cs electrode 418.

The charge collection electrode 407a is formed of an amorphous transparent conductive oxide film. The charge collection electrode 407a is formed to fill the contact hole 421 and layered above the source electrode 410 and the drain electrode 412. The charge collection electrode 407a electrically conducts to the photoconductive layer 404 so that it may collect the charges generated in the photoconductive layer 404.

The interlayer insulation film 420 is composed of acrylic resin having photosensitivity to electrically insulate the switch device 407b. The contact hole 421 passes through the interlayer insulation film 420, and the charge collection electrode 407a is connected to the drain electrode 412. As shown in FIG. 13, the contact hole 421 is formed in an inverse taper shape.

A high-voltage power supply (not shown) is connected between the bias electrode 401 and the Cs electrode 418. A voltage is applied between the bias electrode 401 and the Cs electrode 418 by the high-voltage power supply. With this arrangement, an electric field may be generated between the bias electrode 401 and the charge collection electrode 407a through the charge accumulation capacitance 407c.

Since the photoconductive layer 404 and the charge accumulation capacitance 407c have a structure electrically connected in series, when a bias voltage is applied to the bias electrode 401, charges (electrons-hole pairs) are generated in the photoconductive layer 404. The electrons generated in the photoconductive layer 404 migrate to a +electrode side, holes migrate to a −electrode side with a result that the charges are accumulated in the charge accumulation capacitance 407c.

The overall radiation detector has the plural charge collection electrodes 407a, which are one-dimensionally or two-dimensionally disposed as well as has the charge accumulation capacitances 407c individually connected to the charge collection electrodes 407a and the switch devices 407b individually connected to the charge accumulation capacitances 407c. With this arrangement, when one-dimensional or two-dimensional electromagnetic wave information is accumulated to the charge accumulation capacitances 407c once and the switch devices 407b are sequentially scanned, one-dimensional or two-dimensional charge information may be simply read out.

(Operation Principle of Radiation Detector Using Electric Reading System)

The operation principle of the electromagnetic radiation detector 400 using the electric reading system will be explained.

When X-rays are radiated onto the photoconductive layer 404, charges (electrons-hole pairs) are generated in the photoconductive layer 404. In the state that a voltage is applied between the bias electrode 401 and the Cs electrode 418, that is, in the state that the voltage is applied to the photoconductive layer 404 through the bias electrode 401 and the Cs electrode 418, since the photoconductive layer 404 is electrically connected in series to the charge accumulation capacitance 407c, the electrons generated in the photoconductive layer 404 migrate to a positive electrode side, and the holes generated therein migrate to a negative electrode side with a result that the charges are accumulated to the charge accumulation capacitance 407c.

The charges accumulated to the charge accumulation capacitance 407c is taken out to the outside through the source electrode 410 by turning on the switch device 407b in response to a signal input to the gate electrode 411. Since electrode wiring of the gate electrode 411 and the source electrode 410, the switch devices 407b and the charge accumulation capacitances 407c are disposed in a matrix state, the image information of X-rays may be two-dimensionally obtained by sequentially scanning the signals input to the gate electrode 411 and detecting the signal from each of the source electrodes 410.

Subsequently, the charge collection electrode 407a will be explained in detail. The charge collection electrode 407a used in the exemplary embodiment is composed of the amorphous transparent conductive oxide film. A material having a basic composition of an oxide of indium and tin (ITO: Indium-Tin-Oxide), an oxide of indium and zinc (IZO: Indium-Zinc-Oxide), an oxide of indium and germanium (IGO: Indium-Germanium-Oxide) may be used as the material of the amorphous transparent conductive oxide film.

Although various types of metal films and conductive oxide films are used as the charge collection electrode 407a, a transparent conductive oxide film such as ITO (Indium-Tin-Oxide) and the like is often used because of the following reason. When X-rays are incident on the radiation detector in a large amount, unnecessary charges may be captured in the semiconductor film (or in the vicinity of the interface between the semiconductor film and a layer adjacent to it). Since these residual charges are stored for a long time and migrate in a long time, X-ray detection characteristics are deteriorated when an image is detected thereafter and a residual image (virtual image) appears. To cope with the above affect, a method of erasing the residual charges, when they are generated in the photoconductive layer, by exciting them by irradiating light thereto from the outside of the photoconductive layer is disclosed in JP-A No. 9-9153 (which corresponds to U.S. Pat. No. 563,421). In this case, it is necessary that the charge collection electrode be transparent so that an irradiation light is effectively irradiated from the lower side of the photoconductive layer (from the charge collection electrode). Further, it is desired to form the charge collection electrode so as to cover the switch device for the purpose of increasing the area filling factor (fill factor) of a charge collection electrode or sealing a switch device. However, when the charge collection electrode is opaque, the switch device may not be observed after the charge collection electrode is formed. When, for example, the characteristics of the switch device are examined after the charge collection electrode is formed, if the switch device is covered with the opaque charge collection electrode, even if it is found that characteristics of the switch device are poor, the switch device may not be observed with an optical microscope and the like to solve the cause of the poor characteristics. Accordingly, it is desirable that the charge collection electrode is transparent so that the switch device may be easily observed even after the charge collection electrode is formed.

The bias electrode 401 and the electromagnetic radiation detecting layer may be covered with the protection layer 554 which is composed of the first protection film 554A formed of the insulation member and the second protection film 554B formed of the vapor proof member in the electromagnetic radiation detector 400 using the electric reading system likewise the arrangement shown in FIGS. 6, 7, and 8.

First, the first protection film 554A composed of polyparaxylylene is formed on the bias electrode 401. Next, the second protection film 554B composed of PET as the vapor proof film is bonded on the first protection film 554A by the joint material 562 such as the bonding agent, and the adhesive agent. With this arrangement, the bias electrode 401 and the radiation detecting layer are hermetically sealed by the glass substrate 408, the rib member 560, and the protection layer 554.

Further, the protection layer 554 composed of the first protection film 554A and the second protection film 554B is formed on the bias electrode 401 as well as extends to the end surface of the glass substrate 408. Specifically, the end portion of the protection layer 554 is formed along the end surface of the bias electrode 401, the end surface of the radiation detecting layer, and the end surface of the glass substrate 408 up to the lower end of the end surface of the glass substrate 408.

Further, the reinforcing film 566 as the reinforcement member for covering the end portion of the protection layer 554 is formed from the lower surface of the glass substrate 408 to the surface of the protection layer 554.

Specifically, the reinforcing film 566 is formed along the protection layer 554, and the upper end of the reinforcing film 566 reaches the upper end of the bias electrode 401.

As described above, in the exemplary embodiment, the protection layer 554 and the reinforcing film 566 are alternately bonded. Note that, as shown in the arrangement of the electromagnetic radiation detecting substrate 500, the arrangement for covering the upper electrode and the radiation detecting layer may be variously modified.

The invention is not limited to the above embodiment and may be variously modified, changed, and improved.

The radiation detector according to an aspect of the invention includes a substrate, a lower electrode disposed on the substrate, a radiation detecting layer formed on the upper surface of the lower electrode, an upper electrode formed on the upper surface of the radiation detecting layer, a protection layer which is formed on the upper electrode, whose end portion extends to an end surface of the substrate and which covers the upper electrode, and a reinforcement member which is formed from the lower surface of the substrate to the surface of the protection layer and which covers the end portion of the protection layer.

According to the above arrangement, the radiation detecting layer is formed on the upper surface of the lower electrode disposed on the substrate. The protection layer covers the upper electrode formed on the upper surface of the radiation detecting layer, and the end portion of the protection layer extends to the end surface of the substrate.

The reinforcement member formed from the lower surface of the substrate to the surface of the protection layer covers the end portion of the protection layer. With this arrangement, since the adhesion property of the end portion of the protection layer to the end surface of the substrate is improved, even if time elapses, the end portion of the protection layer is unlikely to be rolled up, thereby the protection layer may be suppressed from being broken.

In the above aspect, the reinforcement member may be formed outside of the detection region for detecting incident radiation.

According to the arrangement, since the reinforcement member is formed outside of the detection region for detecting the incident radiation, the reinforcement member does not interfere with detection of the electromagnetic radiation.

In the above aspect, the reinforcement member may be formed of an insulation member having an insulation property. According to the arrangement, the insulation property of the upper electrode may be secured.

In the above aspect, the reinforcement member may be formed of the flexible member which is deformable along a surface on which the reinforcement member is to be formed.

According to the arrangement, the reinforcement member is liable to be formed on the surface, and since the reinforcing member follows the irregular state of the surface, the adhesion property thereof to the surface may be improved.

In the above aspect, the reinforcement member may be the pre-formed member which is previously formed along the surface on which the reinforcement member is to be formed and may be bonded on the surface.

According to the arrangement, the radiation detector may be manufactured in a simplified manner and the rigidity of the reinforcement member may be increased.

Since the invention is arranged as described above, the protection layer may be suppressed from being broken on the end surface of the substrate of the radiation detector.

What is claimed is:

1. A radiation detector comprising:
   a substrate;
   a lower electrode disposed on the substrate;
   a radiation detecting layer formed on the upper surface of the lower electrode;
   an upper electrode formed on the upper surface of the radiation detecting layer;
   a protection member which is formed on the upper electrode, and which extends along an edge of the radiation detector to a lower edge of the substrate and which covers both the surface and edge portions of the upper electrode; and
   a flexible and deformable reinforcement member that extends along at least a portion of the lower surface of the substrate and further extends along at least a portion of an edge of the radiation detector, the flexible and deformable reinforcement member being adhered to the lower surface of the substrate and adhered to the outer surface of the protection member along said portion of the edge of the radiation detector such that the flexible and deformable reinforcement member is coextensive with the protection member along said portion of the edge of the radiation detector.

2. The radiation detector according to claim 1, wherein the reinforcement member is formed outside of a detection region for detecting incident radiation.

3. The radiation detector according to claim 1, wherein the reinforcement member is an insulation member having an insulation property.

4. The radiation detector according to claim 1, wherein the reinforcement member is a flexible member capable of being deformable along a surface on which the reinforcement member is to be formed.

5. The electromagnetic radiation detector according to claim 1, wherein the reinforcement member is a member previously formed along a surface on which the reinforcement member is to be formed and the reinforcement member is bonded on the surface.

6. The radiation detector according to claim 1, wherein the flexible and deformable reinforcement member is formed in the detection region of the lower surface of the substrate.

7. The radiation detector according to claim 1, wherein the protection member includes at least first and second protection layers.

* * * * *